United States Patent [19]

Sugahara

[11] Patent Number: 5,428,768
[45] Date of Patent: Jun. 27, 1995

[54] SYSTEM FOR CHECKING COMPARISON CHECK FUNCTION OF INFORMATION PROCESSING APPARATUS

[75] Inventor: Hirohide Sugahara, Kawasaki, Japan

[73] Assignee: Fujitsu Limited, Kawasaki, Japan

[21] Appl. No.: 96,005

[22] Filed: Jul. 23, 1993

Related U.S. Application Data

[63] Continuation of Ser. No. 531,086, May 31, 1990, abandoned.

[30] Foreign Application Priority Data

Jun. 12, 1989 [JP] Japan .................................. 1-149143

[51] Int. Cl.6 ......................... G06F 11/18; G06F 11/22
[52] U.S. Cl. .............................. 395/575; 364/DIG. 1;
364/268.1; 371/3; 371/68.3
[58] Field of Search ...................... 395/575; 371/3, 9.1, 371/68.3

[56] References Cited

U.S. PATENT DOCUMENTS 4,849,979  7/1989  Maccianti et al. .................. 371/68.3

FOREIGN PATENT DOCUMENTS 0260584  9/1987  European Pat. Off. ..
109944   6/1983  Japan .......................... 371/3

OTHER PUBLICATIONS

Yen, M. et al., "Designing for Concurrent Error Detection in VLSI: Application to a Microprogram Control Unit", *IEEE J. of Solid-State Circuits*, Aug. 1987, pp. 595–605.

Olson, T., "Fault-Tolerant Chips Increase System Reliability", *Computer Design*, Mar. 15, 1986, pp. 75–80.

*Primary Examiner*—Stephen M. Baker
*Attorney, Agent, or Firm*—Staas & Halsey

[57] ABSTRACT

A check system for checking a comparison check function of an information processing apparatus which includes first and second microprocessors includes a check part for supplying mutually different data to the first and second microprocessors when checking the comparison check function, and a comparing part for comparing data which are output from the first and second microprocessors in response to the mutually different data supplied to the first and second microprocessors. The comparing part generates an alarm when the data output from the first and second microprocessors are mutually different, so that correct operation of the comparison check function can be verified by the alarm when checking the comparison check function.

5 Claims, 6 Drawing Sheets

SYSTEM FOR CHECKING COMPARISON CHECK FUNCTION OF INFORMATION PROCESSING APPARATUS

This application is a continuation of application Ser. No. 07/531,086, filed May 31, 1990, now abandoned.

BACKGROUND OF THE INVENTION

The present invention generally relates to check systems, and more particularly to a check system for checking a comparison check function of an information processing apparatus such as a work station which is provided with dual microprocessors to improve reliability.

Figure 1:
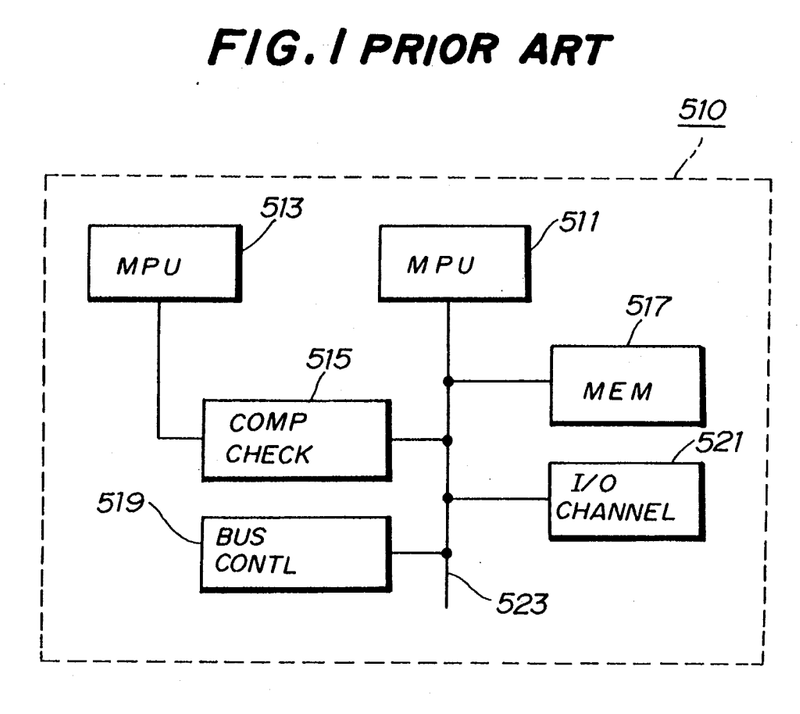
FIG. 1 is a system block diagram showing an example of a conventional information processing apparatus provided with dual microprocessors.

FIG. 1 generally shows a conventional information processing apparatus 510. The information processing apparatus 510 includes dual microprocessing units (MPUs) 511 and 513, a comparison check circuit 515 for comparing outputs of the MPUs 511 and 513, a memory 517 which stores programs for carrying out processes of the information processing apparatus 510, a bus controller 519 for controlling a bus 523, and an input/output channel 521 which controls input/output of data. Although not shown in FIG. 1, a cathode ray tube (CRT) display device for displaying data, a keyboard for entering data, a memory device for storing data and the like are coupled to the input/output channel 521.

As a part of the RAS mechanism, the information processing apparatus 510 is provided with two identical MPUs 511 and 513. The MPUs 511 and 513 independently execute the same program which is stored in the memory 517 in response to common data which is entered. A processed result including an address output from the MPU 511 and a processed result including an address output from the MPU 513 are supplied to the comparison check circuit 515. The comparison check circuit 515 compares the two processed results from the MPUs 511 and 513 and generates a warning when the two processed results differ, so as to interrupt the process of the information processing apparatus 510. It is possible to detect a fault in the MPUs 511 and 513 based on the warning generated from the comparison check circuit 515.

However, the MPUs 511 and 513 which are installed in the conventional information processing apparatus carry out identical operations. For this reason, the MPUs 511 and 513 output identical processed results and there is no means of checking the comparison check function of the information processing apparatus 510. The checking of the comparison check function is made before the MPUs 511 and 513 are installed in the information processing apparatus 510. Alternatively, a pseudo error generation signal is supplied to the comparison check circuit 515 as a substitute for checking the comparison check function after the MPUs 511 and 513 are installed in the information processing apparatus 510. But in any case, there is a problem in that there is no means of accurately checking the comparison check function after the MPUs 511 and 513 are installed in the information processing apparatus 510.

SUMMARY OF THE INVENTION

Accordingly, it is a general object of the present invention to provide a novel and useful check system in which the problems described above are eliminated.

Another and more specific object of the present invention is to provide a check system for checking a comparison check function of an information processing apparatus which includes first and second microprocessors, comprising check means for supplying mutually different data to the first and second microprocessors when checking the comparison check function, and comparing means for comparing data which are output from the first and second microprocessors in response to data supplied to the first and second microprocessors, where the comparing means generates an alarm when the data output from the first and second microprocessors are mutually different, so that a correct comparison check function is indicated by the alarm when checking the comparison check function. According to the check system of the present invention, it is possible to accurately check the comparison check function even where the first and second microprocessors are installed in the information processing apparatus.

Other objects and further features of the present invention will be apparent from the following detailed description when read in conjunction with the accompanying drawings.

DESCRIPTION OF THE PREFERRED EMBODIMENTS

Figure 2:
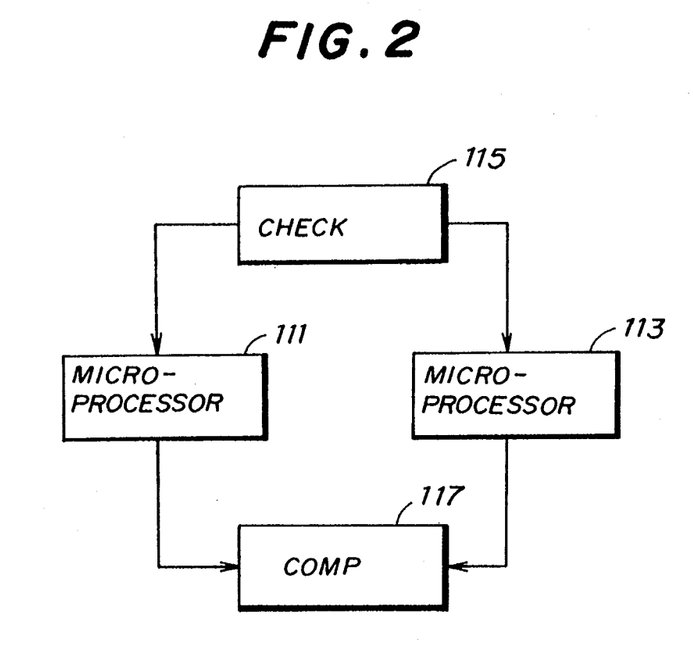
FIG. 2 is a system block diagram for explaining an operating principle of a check system according to the present invention.

First, a description will be given of an operating principle of a check system according to the present invention, by referring to FIG. 2. In FIG. 2, an information processing apparatus includes two microprocessors 111 and 113, a check means 115 and a comparing means 117. The two microprocessors 111 and 113 carry out identical operations, and one is used for normal operation while the other is used for making the operation check. The check means 115 supplies mutually different data to the two microprocessors 111 and 113. The comparing means 117 compares outputs of the two microprocessors 111 and 113 with respect to the data from the check means 115. Accordingly, mutually different data are output from the two microprocessors 111 and 113.

In other words, the check means 115 supplies the mutually different data to the two microprocessors 111 and 113 which execute the same program, and the comparing means 117 compares the outputs of the two microprocessors 111 and 113 to detect that mutually different data are output from the two microprocessors 111 and 113. Using this method, it is possible to check the operation of the comparing means 117.

Figure 3:
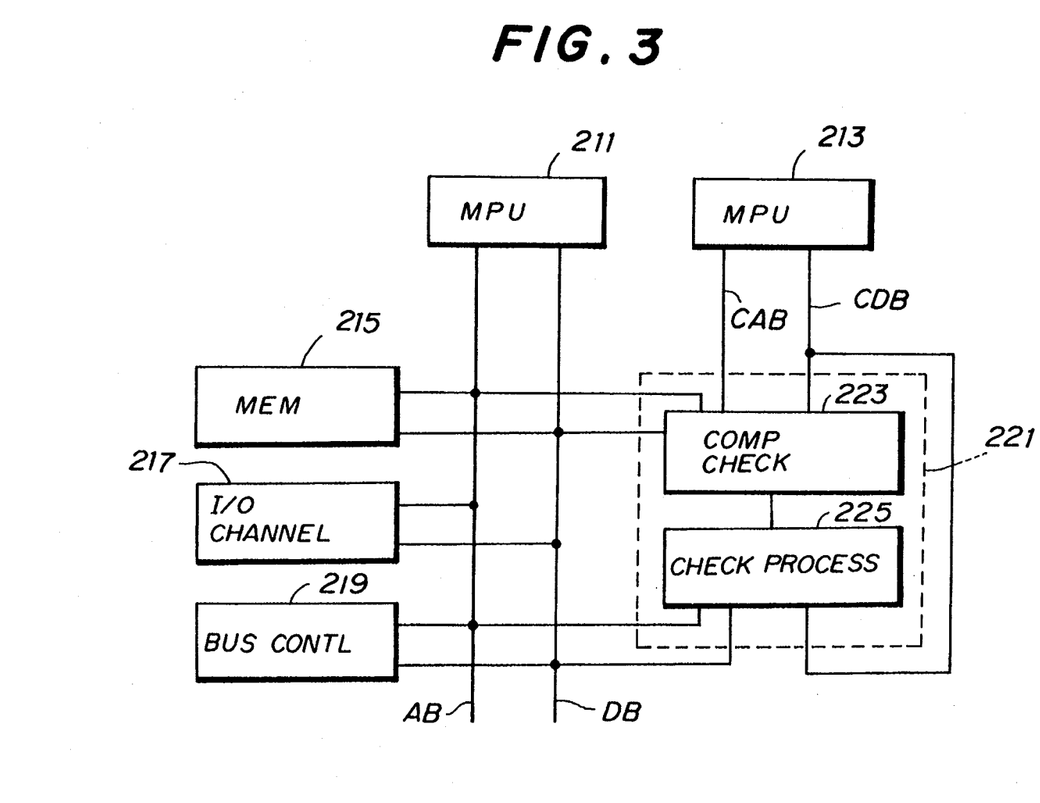
FIG. 3 is a system block diagram of an embodiment of the check system according to the present invention.

Next, a description will be given of an embodiment of the check system according to the present invention, by referring to FIG. 3. In FIG. 3, an information processing apparatus 210 includes dual MPUs 211 and 213, a memory 215, an input/output channel 217, a bus controller 219 and a comparing part 221 which are coupled via a system address bus AB and a system data bus DB. The comparing part 221 includes a comparison check circuit 223 and a check processing part 225.

The MPUs 211 and 213 respectively correspond to the microprocessors 111 and 113 shown in FIG. 2. The check processing part 225 corresponds to the check means 115 shown in FIG. 2. In addition, the comparison check circuit 223 corresponds to the comparing means 117 shown in FIG. 2.

In FIG. 3, the memory 215 stores programs for carrying out processes of the information processing apparatus 210. The input/output channel 217 controls input/output of data on the system data bus DB, and the bus controller 219 controls a system bus which is made up of the system address bus AB and the system data bus DB.

The comparing part 221 checks the operations of the MPUs 211 and 213. The comparison check circuit 223 of the comparing part 221 compares the outputs of the MPUs 211 and 213. On the other hand, the check processing part 225 of the comparing part 221 supplies data to the MPUs 221 and 213 for checking the operation of the comparison check circuit 223.

Although not shown in FIG. 3, a CRT display device for displaying data, a keyboard for entering data, a memory device for storing data and the like are coupled to the input/output channel 217.

The MPU 211 is used for normal operation, and is coupled to other parts of the information processing apparatus 210 via the system bus. The MPU 213 is used to realize the RAS mechanism. This MPU 213 has a structure identical to that of the MPU 211 and carries out operations identical to those of the MPU 211.

Figure 4:
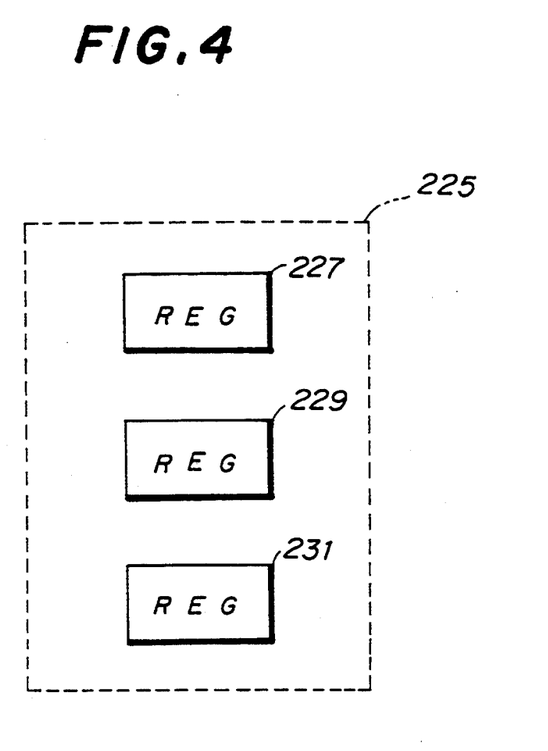
FIG. 4 is a system block diagram of an embodiment of a check processing part 225 of a comparing part 221 shown in FIG. 3.

FIG. 4 shows an embodiment of the check processing part 225. The check processing part 225 includes three control registers 227, 229 and 231. An access can be made to each of the three control registers 227, 229 and 231 from the MPUs 211 and 213 by making an appropriate address designation. For the sake of convenience, addresses "a", "b" and "c" are respectively assigned to the three control registers 227, 229 and 231.

The control registers 227 and 229 are both used for writing data therein. On the other hand, the control register 231 is used for reading data therefrom, and is provided as a virtual register for reading mutually different data into the MPUs 211 and 213.

Figure 5:
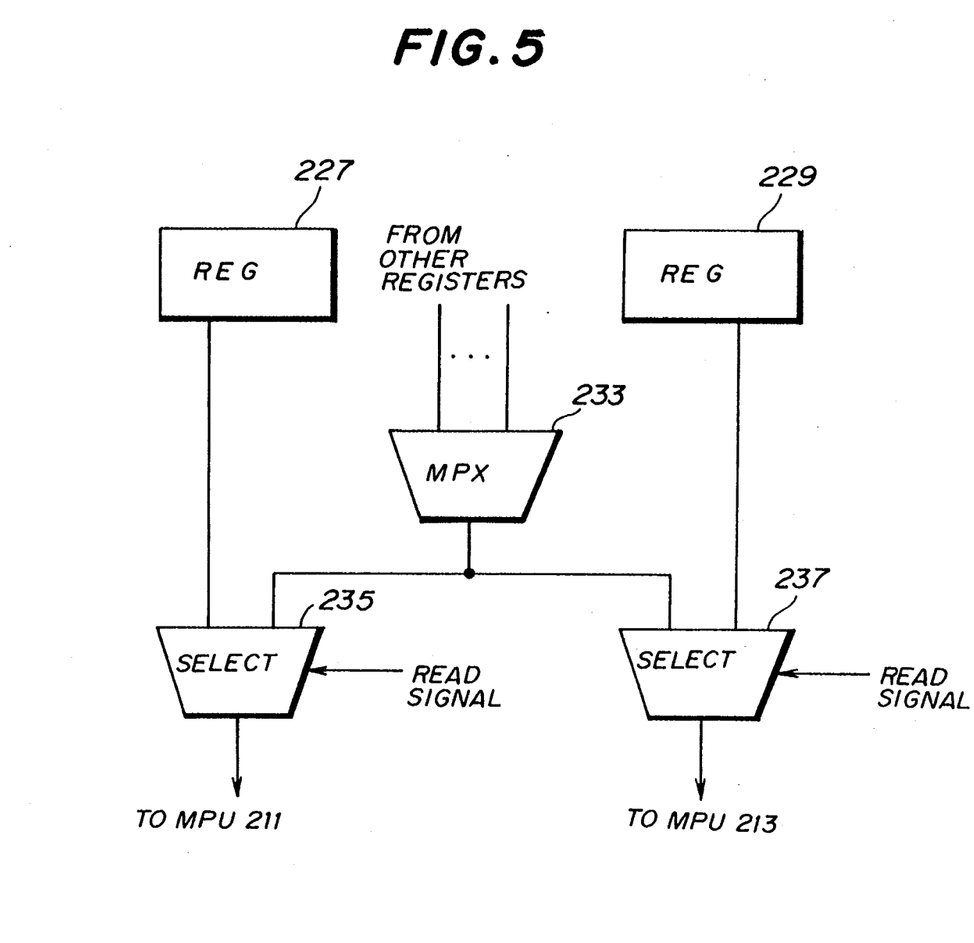
FIG. 5 is a system block diagram of an embodiment of a comparison check circuit 223 of the comparing part 221 shown in FIG. 3 together with a part of the check processing part 225.

FIG. 5 shows an embodiment of the comparison check circuit 223 together with a part of the check processing part 225. The comparison check circuit 223 generally includes a multiplexer 233 and selectors 235 and 237. Although not shown in FIG. 5, outputs of various registers are coupled to an input of the multiplexer 233. The multiplexer 233 selects an output of one of the various registers and supplies this output to one input terminal of each of the selectors 235 and 237. The output of the control register 227 is supplied to the other input terminal of the selector 235, and the output of the control register 229 is supplied to the other input terminal of the selector 237.

An output of the selector 235 is coupled to the MPU 211, while an output of the selector 237 is coupled to the MPU 213. The selection operation of the selectors 235 and 237 is controlled by a read signal which is output from the MPU 211 when the MPU 211 makes a read operation using the control register 231.

During normal operation, the output of the multiplexer 233 is selected by the selectors 235 and 237. Hence, identical data are supplied to the MPUs 211 and 213 from the respective selectors 235 and 237.

On the other hand, when the MPUs 211 and 213 make a read operation using the control register 231, the selectors 235 and 237 supply mutually different data to the corresponding MPUs 211 and 213.

When the MPUs 211 and 213 designate the address "c" and make the read operation, the read signal is supplied to the selectors 235 and 237. The selector 235 supplies the data from the control register 227 to the MPU 211 when the read signal is received. Similarly, the selector 237 supplies the data from the control register 229 to the MPU 213 when the read signal is received.

Next, a description will be given of the operation of the information processing apparatus 210 as it relates to the comparison check circuit 223. For example, the MPU 213 executes a test program stored in the memory 215 so as to carry out the following check operation.

First, the MPUs 211 and 213 designate the address "a" of the control register 227 and write a predetermined data A. Then, the MPUs 211 and 213 designate the address "b" of the control register 229 and write another data B which is different from the predetermined data A.

When the address "c" of the control register 231 is designated and the MPUs 211 and 213 make the read operation after writing the mutually different data A and B to the control registers 227 and 229, the data A stored in the control register 227 is read into the MPU 211 while the data B stored in the control register 229 is read into the MPU 213.

The MPUs 211 and 213 carry out the same process based on the mutually different data A and B read therein. Processed results from the MPUs 211 and 213 are supplied to the comparison check circuit 223.

Because the data A and B supplied to the MPUs 211 and 213 are mutually different, mutually different processed results (outputs) are supplied to the comparison check circuit 223.

In a case where the comparison check circuit 223 is operating correctly, the comparison check circuit 223 generates an alarm because of the mutually different outputs of the MPUs 211 and 213.

When the alarm is generated during the normal operation, the operations of the MPUs 211 and 213 are stopped. However, during the check operation of the comparison check circuit 223, the MPUs 211 and 213 continue to execute the test program without stopping the operations thereof.

Therefore, when the check processing part 225 supplies mutually different data to the MPUs 211 and 213, the MPUs 211 and 213 supply mutually different data to the comparison check circuit 223. Hence, it is possible to test the operation of the comparison check circuit 223.

Next, a more detailed description will be given of an embodiment of the comparing part 221 shown in FIG. 3, by referring to FIG. 6.

Figure 6:
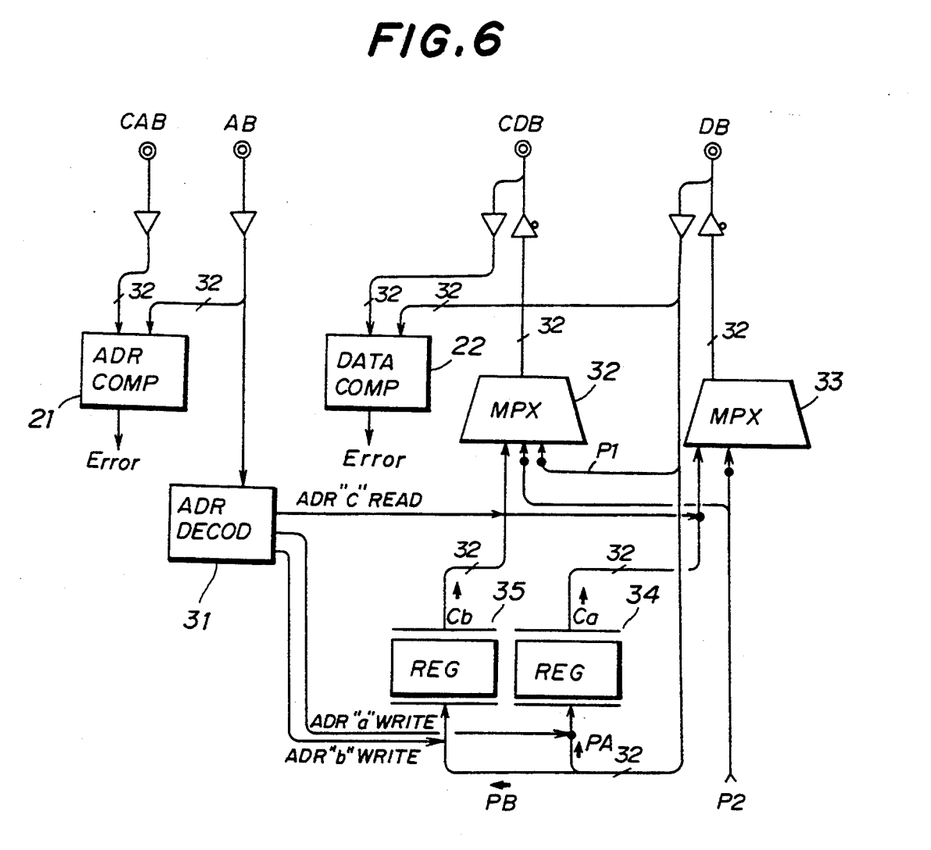
FIG. 6 is a system block diagram of an embodiment of a comprising part 221 shown in FIG. 3.

In FIG. 6, the comparison check circuit 233 generally includes an address comparing circuit 21 and a data comparing circuit 22. The address comparing circuit 21 is coupled to the system address bus AB and a check address bus CAB, and the data comparing circuit 22 is coupled to the system data bus DB and a check data bus CDB. The address comparing circuit 21 constantly compares the addresses from the buses AB and CAB when the MPUs 211 and 213 obtain the right to use the system bus. The data comparing circuit 22 constantly compares the data from the buses DB and CDB when the MPUs 211 and 213 obtain the right to use the system bus and make a write operation.

In FIG. 6, the check processing part 225 generally includes an address decoder 31, multiplexers 32 and 33, and registers 34 and 35. The registers 34 and 35 respectively correspond to the control registers 227 and 229. The address decoder 31 decodes the address from the system address bus AB. When a write access is made to the register 34 from the MPU 211, the data is set in the register 34 via a path PA. When a write access is made to the register 35 from the MPU 213, the data is set in the register 35 via a path PB. On the other hand, when a read access is made from the MPUs 211 and 213, the data is read from the register 34 via a path Ca and supplied to the MPU 211 while the data is read from the register 35 via a path Cb and supplied to the MPU 213. When making a read access to other units, the data identical to the data on the system data bus DB is also read into the MPU 213 via a path P1. When making a read access to an internal register within the same unit, identical data are read into the MPUs 211 and 213 via a path P2.

Figure 7:
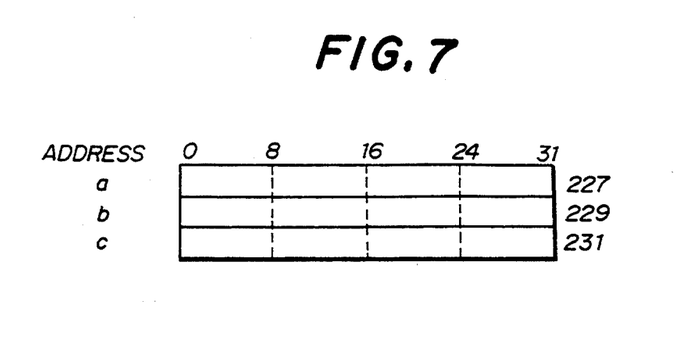
FIG. 7 is a register map for explaining an operation of the comparing part shown in FIG. 6.

FIG. 7 shows a register map within the check processing part 225 shown in FIG. 6. Thirty-two bits are provided at each of the addresses "a", "b" and "c". As described before, the data set at the address "a" (control register 227) is the data which is to be read into the MPU 211 when the read access is made to the address "c" (control register 231) from the MPU 211. Similarly, the data set at the address "b" (control register 229) is the data which is to be read into the MPU 213 when the read access is made to the address "c" from the MPU 213. The address "c" (control register 231) is provided to read mutually different data into the MPUs 211 and 213.

The check sequence is as follows. The diagnostic data A is written into the address "a", and the diagnostic data B is written into the address "b". Up to this point in time, the operations of the MPUs 211 and 213 are identical. Then, the MPUs 211 and 213 make a read access to the address "c" and read mutually different data A and B into the respective internal registers R00. The MPUs 211 and 213 carry out identical operations on the mutually different diagnostic data A and B. Next, when the MPUs 211 and 213 make a write operation to write the contents of the respective internal registers R00, the data comparing circuit 22 shown in FIG. 6 should generate an error signal. Thus, the data comparing circuit 22 can be checked to ensure its proper operation. Similarly, when an access is made using the contents of the internal registers R00 of the MPUs 211 and 213 as addresses, the address comparing circuit 21 shown in FIG. 6 should generate an error signal. Thus, the address comparing circuit 21 can be checked to ensure its proper operation. After the difference in the contents of the internal registers R00 of the MPUs 211 and 213 is eliminated such as by reading the data from an address other than the address "c", the MPUs 211 and 213 can continue to carry out identical operations.

As a modification of this embodiment, it is possible to provide thirty-two bits at only the address "a" and provide only five bits at the address "b". When the read access is made to the address "c" from the MPU 211, the 32-bit data stored at the address "a" is read out and supplied to the MPU 211. On the other hand, when the read access is made to the address "c" from the MPU 213, one of the 32 bits of the data stored at the address "a" is inverted depending on the bit location indicated by the 5-bit data stored at the address "b" and supplied to the MPU 213. According to this modification, it is possible to reduce the number of bits of the register 229.

In the described embodiment, the control registers 227 and 229 are provided to supply the mutually different data to the MPUs 211 and 213. However, when supplying mutually different fixed data to the MPUs 211 and 213, it is possible to simplify the system structure by making a connection to a power source line or a ground line.

Further, the present invention is not limited to these embodiments, but various variations and modifications may be made without departing from the scope of the present invention.

What is claimed is:

1. A check system for checking a comparison check function of an information processing apparatus which includes first and second microprocessors, said check system comprising:

check means for supplying mutually different data to the first and second microprocessors when checking the comparison check function; and comparing means for comparing data output from the first and second microprocessors in response to the mutually different data supplied to the first and second microprocessors, said comparing means generating an alarm when the data output from the first and second microprocessors are mutually different, so that correct operation of the comparison check function is indicated by said alarm when checking the comparison check function, each of the first and second microprocessors making a write access and a read access, and said check means including register means having a register map such that a first diagnostic data is written at a first address when the write access is made from the first and second microprocessors, a second diagnostic data which is different from the first diagnostic data is written at a second address when the write access is made from the first and second microprocessors, and the first and second diagnostic data are respectively read out to be supplied to the first and second microprocessors when the read accesses are made to a third address from the first and second microprocessors.

2. The check system as claimed in claim 1, wherein said comparing means includes:

address comparing means for comparing addresses of the first and second microprocessors; and data comparing means for comparing data of the first and second microprocessors, said address comparing means outputting the alarm when accesses are made to the data which are read into the first and second microprocessors by the read accesses to the third address of the register means as addresses, said data comparing means outputting the alarm when the write accesses are made by the first and second microprocessors to write the data which are read into the first and second microprocessors by the read accesses to the third address of said register means.

3. The check system as claimed in claim 1, wherein said check means includes selector means for selectively supplying the first diagnostic data from said register means to the first microprocessor and the second diagnostic data from said register means to the second microprocessor when checking the comparison check function.

4. The check system as claimed in claim 3, wherein said selector means selectively supplies identical data to the first and second microprocessors, except when the first and second microprocessors make the read accesses to the third address of said register means.

5. A check system for checking a comparison check function of an information processing apparatus which includes first and second microprocessors, said check system comprising:

check means for supplying mutually different data which are fixed, to the first and second microprocessors when checking the comparison check function; and comparing means for comparing data output from the first and second microprocessors in response to the mutually different data supplied to the first and second microprocessors, said comparing means generating an alarm when the data output from the first and second microprocessors are mutually different, so that correct operation of the comparison check function is indicated by said alarm when checking the comparison check function, the fixed data including first data having a predetermined number of bits and second data designating one of the predetermined number of bits for inversion.

* * * * *

UNITED STATES PATENT AND TRADEMARK OFFICE
CERTIFICATE OF CORRECTION

PATENT NO. : 5,428,768
DATED : June 27, 1995
INVENTOR(S) : Hirohide SUGAHARA

It is certified that error appears in the above-indentified patent and that said Letters Patent is hereby corrected as shown below:

Col. 3, line 28, "221" should be --211--.

Signed and Sealed this

Fifth Day of September, 1995

*Attest:*

BRUCE LEHMAN

*Attesting Officer*  *Commissioner of Patents and Trademarks*